(12) United States Patent
Fukamachi

(10) Patent No.: US 10,889,710 B2
(45) Date of Patent: Jan. 12, 2021

(54) RESIN COMPOSITION

(71) Applicant: MITSUBISHI CHEMICAL CORPORATION, Tokyo (JP)

(72) Inventor: Yuya Fukamachi, Tokyo (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/806,230

(22) Filed: Mar. 2, 2020

(65) Prior Publication Data

US 2020/0199343 A1 Jun. 25, 2020

Related U.S. Application Data

(63) Continuation of application No. PCT/JP2018/032311, filed on Aug. 31, 2018.

(30) Foreign Application Priority Data

Sep. 7, 2017 (JP) ................. 2017-172434

(51) Int. Cl.
*C08L 29/04* (2006.01)
*C08J 3/12* (2006.01)
*C08K 5/159* (2006.01)

(52) U.S. Cl.
CPC ............. *C08L 29/04* (2013.01); *C08J 3/12* (2013.01); *C08K 5/159* (2013.01); *C08L 2203/16* (2013.01); *C08L 2203/30* (2013.01)

(58) Field of Classification Search
None
See application file for complete search history.

(56) References Cited

U.S. PATENT DOCUMENTS 4,844,828 A * 7/1989 Aoki .................... C11D 17/044
510/296
2009/0286909 A1 11/2009 Shibutani et al.
2016/0221314 A1* 8/2016 Kawai ................. C08L 23/0861
2016/0243746 A1* 8/2016 Kawai ..................... B32B 27/18
2016/0251500 A1 9/2016 Kawai

FOREIGN PATENT DOCUMENTS

| CN | 106366640 A | 2/2017 | |
|---|---|---|---|
| JP | H06-240089 | 8/1994 | |
| JP | H08-059944 | 3/1996 | |
| JP | 2000-63728 | 2/2000 | |
| JP | 2000063728 A * | 2/2000 | |
| JP | 2002-256126 | 9/2002 | |
| JP | 2004-18463 | 1/2004 | |
| JP | 2008/208347 | 9/2008 | |
| JP | 2015-071689 A | 4/2015 | |
| JP | 2015-071692 | 4/2015 | |
| WO | WO-2004003028 A1 * | 1/2004 | ............ C09J 129/14 |

OTHER PUBLICATIONS

JP2000-063728 English Machine Translation, prepared Sep. 23, 2020. (Year: 2020).*
WO2004003028 English Machine Translation, prepared Sep. 23, 2020. (Year: 2020).*
ISR issued in WIPO Patent Application No. PCT/JP2018/032311, dated Nov. 13, 2018, English translation.
Written Opinion issued in WIPO Patent Application No. PCT/JP2018/032311, dated Nov. 13, 2018.
IPRP issued in WIPO Patent Application No. PCT/JP2018/032311, dated Mar. 10, 2020, English translation.
EP—European Extended Search Report for EP App. No. 18853801.1, dated Jun. 2, 2020.

* cited by examiner

*Primary Examiner* — Christopher M Rodd
(74) *Attorney, Agent, or Firm* — Greenblum & Bernstein, P.L.C.

(57) ABSTRACT

An object of the present invention is to provide a resin composition for reducing an acetic acid odor that is generated during melt molding of a polyvinyl alcohol (PVA)-based resin and may remain in a molded product. The resin composition of the present invention contains: a PVA-based resin (A); and a multimeric aldehyde compound (B), wherein a content of the multimeric aldehyde compound (B) is $0.5 \times 10^{-4}$ to $100 \times 10^{-4}$ parts by weight with respect to 100 parts by weight of the PVA-based resin (A).

5 Claims, No Drawings

RESIN COMPOSITION

CLAIM FOR PRIORITY

This application is a Continuation of PCT/JP2018/032311 filed Aug. 31, 2018, and claims the priority benefit of Japanese application 2017-172434 filed Sep. 7, 2017, the contents of which are expressly incorporated by reference herein in their entireties.

TECHNICAL FIELD

The present invention relates to a resin composition containing a polyvinyl alcohol (hereinafter abbreviated as PVA)-based resin.

BACKGROUND ART

Vinyl alcohol resins such as a PVA-based resin or a saponified ethylene-vinyl acetate copolymer (hereinafter abbreviated as EVOH) are excellent in solvent resistance, gas barrier property, strength, transparency, and the like, and are therefore used in molded products such as packaging films for food or the like.

However, in a case of melt molding the PVA-based resin, an odor of acetic acid (hereinafter also referred to as acetic acid odor) from degassing during the melt molding and a discharge port of an extruder may be generated, and the acetic acid odor may remain in pellets obtained by melt molding. In order to reduce the acetic acid odor, there is a method of adding another smell odor by using a fragrance or the like. When a packaging film for food or the like is molded using such pellets, the commercial value of the packaged goods may be impaired.

On the other hand, as a technique for preventing thermal deterioration of the resin and preventing the odor, for example, Patent Literature 1 discloses a resin composition containing an EVOH and a predetermined amount of a saturated aldehyde such as propanal.

CITATION LIST

Patent Literature

Patent Literature 1: JP-A-2015-71692

SUMMARY OF INVENTION

Technical Problem

However, the resin composition described in the Patent Literature contains a saturated aldehyde in order to prevent coloring of a molded product and to prevent gelation during melt molding, and the resin composition is not intended to reduce the acetic acid odor.

Under such circumstances, an object of the present invention is to provide a resin composition for reducing an acetic acid odor that is generated during melt molding of a PVA-based resin and can remain in a molded product.

Solution to Problem

The present inventor has conducted intensive studies in view of the above circumstances, and as a result, found that the problems can be solved by a resin composition containing a specific amount of a specific aldehyde compound with respect to a PVA-based resin. The present invention was completed on the basis of this finding.

That is, the gist of the present invention relates to a resin composition containing: a PVA-based resin (A); and a multimeric aldehyde compound (B), wherein a content of the multimeric aldehyde compound (B) is $0.5 \times 10^{-4}$ to $100 \times 10^{-4}$ parts by weight with respect to 100 parts by weight of the polyvinyl alcohol-based resin (A).

In the resin composition of the present invention, the PVA-based resin (A) is preferably a PVA-based resin for melt molding (A1), and a viscosity average polymerization degree of the PVA-based resin (A) is preferably 200 to 800.

In addition, a degree of saponification of the polyvinyl alcohol-based resin (A) is preferably 60 mol % to 100 mol %, and the multimeric aldehyde compound (B) is preferably paraldehyde.

Advantageous Effects of Invention

According to the resin composition of the present invention, the acetic acid odor generated from the degassing during the melt molding of the PVA-based resin and the discharge port of the extruder are reduced. Therefore, the acetic acid odor of the pellet of the resin composition is eliminated, and the acetic acid odor of a molded product formed using the pellet is prevented. Although the effect of the present invention is not clear, it is presumed that the multimeric aldehyde compound (B) has a masking effect on acetic acid, and that the generation of odor (specifically, acetic acid odor) can be prevented without adversely affecting the melt molding of the PVA-based resin (A).

DESCRIPTION OF EMBODIMENTS

The description of the constituent requirements described below is an example (representative example) of an embodiment of the present invention, and the present invention is not limited to these contents.

The resin composition of the present invention contains a PVA-based resin (A) and a multimeric aldehyde compound (B). First, the PVA-based resin (A) is described.

[PVA-Based Resin (A)]

The PVA-based resin (A) to be used in the present embodiment has a vinyl alcohol structural unit equivalent to degree of saponification and a vinyl ester structural unit in an unsaponified moiety.

In the present embodiment, examples of the PVA-based resin (A) include, in addition to an unmodified PVA, a copolymer-modified PVA obtained by copolymerizing various monomers during the production of a vinyl ester resin and saponifying the copolymer, or various post-modified PVAs in which various functional groups are introduced into the unmodified PVA by post-modification. Such modification can be performed within a range where the water solubility of the PVA-based resin (A) is not lost. In some cases, the modified PVA may be further post-modified.

Examples of the monomer to be used in the copolymerization of the vinyl ester monomer in the production of the vinyl ester resin include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof;

alkyl vinyl ethers; N-acrylamidomethyltrimethylammonium chloride; allyltrimethylammonium chloride; dimethylallyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene (1-(meth)acrylamide-1,1-dimethylpropyl) ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof.

Examples further include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diasiloxy-1-pentene, 4,5-dihydroxy-3-methyl-1-pentene, 4,5-diasiloxy-3-methyl-1-pentene, 5,6-dihydroxy-1-hexene, 5,6-diasiloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

The content of these monomers is preferably within a range where the water solubility is not lost.

Examples of the post-modified PVA obtained by introduction of functional groups by post-modification include a resin having an acetoacetyl group introduced by a reaction with a diketene, a resin having a polyalkylene oxide group introduced by a reaction with ethylene oxide, a resin having a hydroxyalkyl group introduced by a reaction with an epoxy compound or the like, or a resin obtained by reacting an aldehyde compound having any of a variety of functional groups with a PVA-based resin.

In the present invention, the PVA-based resin (A) is preferably a PVA-based resin for melt molding (A1) in consideration of application to various molded products. The PVA-based resin for melt molding is a PVA-based resin capable of hot melt molding and suitable for melt molding, and refers to a PVA-based resin having a relatively low melting point. The melting point of the PVA-based resin for melt molding (A1) is generally 140° C. to 230° C., preferably 145° C. to 220° C., more preferably 150° C. to 200° C., still more preferably 155° C. to 200° C. and particularly preferably 155° C. to 190° C.

The melting point is a value measured with a differential scanning calorimeter (DSC) at a temperature rising/falling rate of 10° C./min.

In order to achieve a relatively low melting point as described above, to lower the degree of saponification of the PVA-based resin or to use of a modified PVA-based resin are exemplified.

When a modified PVA-based resin is used as the PVA-based resin for melt molding (A1), a PVA-based resin containing a structural unit having a primary hydroxyl group in the side chain and an ethylene-modified PVA-based resin are preferred, and a PVA-based resin containing a structural unit having a primary hydroxyl group in side chain is particularly preferred from the viewpoint of being excellent melt moldability. The number of the primary hydroxyl group in such a structural unit is generally 1 to 5, preferably 1 to 2, and particularly preferably 1. In addition to the primary hydroxyl group, a secondary hydroxyl group is preferably included.

Examples of such a PVA-based resin containing a structural unit having a primary hydroxyl group in the side chain include a modified PVA-based resin having a 1,2-diol structural unit in the side chain and a modified PVA-based resin having a hydroxyalkyl group structural unit in the side chain. Among these, it is particularly preferable to use a modified PVA-based resin containing a 1,2-diol structural unit in the side chain (hereinafter, may be referred to as "modified PVA-based resin containing a side-chain 1,2-diol structural unit") represented by the following general formula (1).

The moiety other than the 1,2-diol structural unit is a vinyl alcohol structural unit and a vinyl ester structural unit in an unsaponified moiety, similar to a general PVA-based resin.

[Chem. 1]

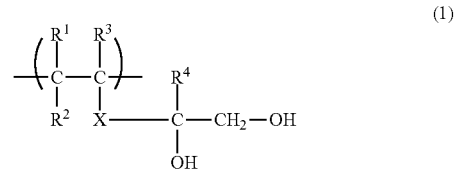

(1)

(In the above general formula (1), $R^1$ to $R^4$ each independently represent a hydrogen atom or an alkyl group having 1 to 4 carbon atoms that may have a substituent, and X represents a single bond or a bond chain.)

In the above general formula (1), $R^1$ to $R^4$ each independently represent a hydrogen atom or an alkyl group having 1 to 4 carbon atoms that may have a substituent. In order that the end of the side chain is a primary hydroxyl group, $R^1$ to $R^4$ are preferably all hydrogen atoms, however may be an alkyl group having 1 to 4 carbon atoms as long as the resin properties are not significantly impaired. The alkyl group having 1 to 4 carbon atoms is not particularly limited, and examples thereof include a methyl group, an ethyl group, an n-propyl group, an isopropyl group, an n-butyl group, an isobutyl group, and a tert-butyl group. Examples of the substituent that the alkyl group may have include a halogen group, a hydroxyl group, an ester group, a carboxylic acid group, and a sulfonic acid group.

In the above general formula (1), X represents a single bond or a bond chain. X is preferably a single bond from the viewpoints of thermal stability and stability under high temperature or acidic conditions.

The bond chain is not particularly limited, and examples thereof include hydrocarbon groups such as an alkylene group, an alkenylene group, an alkynylene group, a phenylene group, and a naphthylene group (these hydrocarbon groups may be substituted with a halogen group such as a fluorine atom, a chlorine atom or a bromine atom), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. Each R is independently a hydrogen atom or an optionally substituent, and is preferably a hydrogen atom or an alkyl group (particularly an alkyl group having 1 to 4 carbon atoms). m is a natural number, and is preferably 1 to 10, particularly preferably 1 to 5.

When X is a bond chain, X is preferably an alkylene group having 6 or less carbon atoms, and particularly a methylene group, or —$CH_2OCH_2$— from the viewpoint of viscosity stability or heat resistance during the production.

In a particularly preferred structure of the 1,2-diol structural unit represented by the general formula (1), $R^1$ to $R^4$ are all hydrogen atoms, and X is a single bond.

The degree of saponification (measured according to JIS K6726) of the PVA-based resin (A) to be used in the present embodiment is generally 60 mol % to 100 mol %.

The preferred range of the degree of saponification varies depending on the modified species. For example, in the case of an unmodified PVA-based resin, the degree of saponification is generally 60 mol % to 99.9 mol %, preferably 65 mol % to 95 mol %, and particularly preferably 70 mol % to 90 mol %. When the degree of saponification is excessively high, the melting point and the decomposition temperature are close to each other and melt molding tends to be difficult; when the degree of saponification is excessively low, the water solubility tends to decrease.

The degree of saponification of the modified PVA-based resin containing a side-chain 1,2-diol structural unit is generally 60 mol % to 99.9 mol %, preferably 65 mol % to 99.8 mol %, and particularly preferably 70 mol % to 99.5 mol %. When the degree of saponification is excessively low, the water solubility tends to decrease.

The degree of saponification of an ethylene-modified PVA-based resin modified with a small amount of ethylene is generally 60 mol % or more, preferably 70 mol % to 95 mol %, and particularly preferably 71 mol % to 90 mol %. When the degree of saponification is excessively high, the melting point and the decomposition temperature are close to each other and melt molding tends to be difficult; when the degree of saponification is excessively low, the water solubility tends to decrease.

The viscosity average polymerization degree (measured according to JIS K6726) of the PVA-based resin (A) to be used in the present embodiment is generally 100 to 3000, preferably 150 to 2000, particularly preferably 180 to 1000, and still more preferably 200 to 800. When the viscosity average polymerization degree is excessively large, the melt viscosity during the melt molding tends to be high, and the melt molding tends to be difficult.

When the PVA-based resin (A) is a modified PVA-based resin, the modification rate in this modified PVA-based resin, that is the content of a structural unit derived from various monomers in the copolymer, or the content of functional groups introduced by post-modification cannot be said unconditionally because the characteristics vary greatly depending on the type of functional group, and is generally 0.1 mol % to 20 mol %.

The modification rate when the PVA-based resin (A) is the modified PVA-based resin containing a side-chain 1,2-diol structural unit is generally 0.1 mol % to 20 mol %, preferably 0.5 mol % to 10 mol %, and particularly preferably 1 mol % to 8 mol %. When the modification rate is excessively high or excessively low, the melt molding tends to be difficult.

The content of the 1,2-diol structural unit in the PVA-based resin can be determined from a $^1$H-NMR spectrum (solvent: DMSO-$d_6$, internal standard: tetramethylsilane) of a PVA-based resin having a degree of saponification of 100 mol %. Specifically, the content can be calculated based on the peak areas derived from a hydroxy proton, a methine proton, and a methylene proton in the 1,2-diol structural unit, a methylene proton in the main chain, a proton of a hydroxy group linked to the main chain, and the like.

The modification rate when the PVA-based resin (A) is an ethylene-modified PVA-based resin modified with a small amount of ethylene is generally 0.1 mol % to 15 mol %, preferably 0.5 mol % to 10 mol %, still preferably 1 mol % to 10 mol %, and particularly preferably 5 mol % to 9 mol %. When the modification rate is excessively high, the water solubility tends to decrease; when the modification rate is excessively low, the melt molding tends to be difficult.

The PVA-based resin (A) to be used in the present embodiment may be one type or a mixture of two or more types. In the case of using two or more types of the PVA-based resin (A), for example, a combination of two or more unmodified PVA-based resins with different degrees of saponification, viscosity average polymerization degree, or melting points; a combination of an unmodified PVA-based resin and a modified PVA-based resin; or a combination of two or more modified PVA-based resins with different degrees of saponification, viscosity average polymerization degree, melting points, functional group types or modification rates is used. It is preferable that average values of the degree of saponification, the viscosity average polymerization degree, the modification rate or the like is within preferred ranges of the present embodiment.

The bonding mode of the main chain of the PVA-based resin (A) to be used in the present embodiment is mainly 1,3-diol bonding, and the content of a 1,2-diol bond is about 1.5 mol % to 1.7 mol %. The content of the 1,2-diol bond can be increased by increasing a polymerization temperature during polymerization of the vinyl ester monomers, and the content thereof can be increased to 1.8 mol % or more, and further to 2.0 mol % to 3.5 mol %.

Examples of a method for producing the PVA-based resin (A) to be used in the present embodiment include a method of polymerizing vinyl ester monomers such as vinyl acetate and saponifying.

Examples of the vinyl ester monomer include vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

The polymerization of the vinyl ester monomers can be performed by any known polymerization method such as solution polymerization, suspension polymerization, and emulsion polymerization. Among these, it is preferable to perform the solution polymerization which can remove reaction heat efficiently under reflux. As a solvent for the solution polymerization, an alcohol is generally used, and a lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Generally, saponification is preferably performed by a transesterification reaction using an alkali catalyst in the presence of an anhydrous alcohol solvent in terms of reaction rate or reduction of impurities such as fatty acid salts.

The reaction temperature of the saponification reaction is generally 20° C. to 60° C. When the reaction temperature is excessively low, the reaction rate tends to decrease and the reaction efficiency tends to decrease; when the reaction temperature is excessively high, the reaction temperature may exceed the boiling point of the reaction solvent, and the safety in production tends to decrease. In a case of performing the saponification under a high pressure using a tower-type continuous saponification tower with high pressure resistance, the saponification can be performed at a higher temperature, for example, 80° C. to 150° C., and a PVA-based resin with a high degree of saponification can be obtained in a short time even using a small amount of saponification catalyst.

The modified PVA-based resin containing a side-chain 1,2-diol structural unit can be produced by a known production method. For example, the above modified PVA-based resin can be produced by a method described in JP-A-2002-284818, JP-A-2004-285143, or JP-A-2006-95825.

[Multimeric Aldehyde Compound (B)]

The resin composition of the present invention contains a specific amount of the multimeric aldehyde compound (B). The multimeric aldehyde compound is mixed in a small amount during the production of the PVA-based resin. In the present invention, in addition to the multimeric aldehyde compound contained in the production of the PVA-based resin, the multimeric aldehyde compound is additionally contained, and accordingly the content thereof is in the range of $0.5 \times 10^{-4}$ to $100 \times 10^{-4}$ parts by weight with respect to 100 parts by weight of the PVA-based resin (A). In the present description, the multimeric aldehyde compound refers a cyclic complex obtained by polymerizing two or more acetaldehydes.

Examples of the multimeric aldehyde compound (B) to be used in the present embodiment include paraldehyde and metaldehyde. Preferably, paraldehyde alone, metaldehyde alone, or a mixture of paraldehyde and metaldehyde can be used.

It is important that the content of the multimeric aldehyde compound (B) in the resin composition of the present embodiment is $0.5 \times 10^{-4}$ to $100 \times 10^{-4}$ parts by weight with respect to 100 parts by weight of the PVA-based resin (A). As described above, although the effect of the present invention is not clear, it is presumed that the multimeric aldehyde compound (B) has a masking effect on acetic acid, and that the generation of odor (specifically, acetic acid odor) can be prevented without adversely affecting the melt molding of the PVA-based resin (A).

The content of the multimeric aldehyde compound (B) is preferably $0.5 \times 10^{-4}$ to $20 \times 10^{-4}$ parts by weight, and particularly preferably $0.5 \times 10^{-4}$ to $10 \times 10^{-4}$ parts by weight with respect to 100 parts by weight of the PVA-based resin (A). When the content of the multimeric aldehyde compound (B) is excessively small, the effect of preventing the acetic acid odor tends to be difficult to obtain; when the content of the multimeric aldehyde compound (B) is excessively large, the thermal deterioration of the PVA-based resin (A) tends to be exacerbated, and the molded product tends to be easily colored during the melt molding.

The method of measuring the content of the multimeric aldehyde compound (B) in the resin composition is as follows:

First, a standard solution for quantification is prepared, the amount of the multimeric aldehyde compound (B) is measured by a headspace gas chromatograph method, and the measurement result is used to quantify the multimeric aldehyde compound (B) contained in the resin composition.

(1) Preparation of Standard Solution for Quantification

One (1) g of the multimeric aldehyde compound (B) is collected into a well-washed glass measuring flask (100 mL) and dissolved with acetone, and an acetone solution containing the multimeric aldehyde compound (B) in a concentration of 10000 mg/L is obtained.

Further, the acetone solution is diluted with acetone to prepare several types of standard solutions containing the multimeric aldehyde compound (B) in concentrations of 40 mg/L to 5000 mg/L.

(2) Creation of Calibration Curve

One (1) μL of each of the standard solutions containing the multimeric aldehyde compound (B) in concentrations of 40 mg/L to 5000 mg/L prepared in (1) above is collected into a headspace vial, and the headspace vial is quickly sealed with an aluminum cap and heated to 120° C. to vaporize the multimeric aldehyde compound (B). A peak is measured by a headspace gas chromatograph method under the conditions shown in Table 1 below, and a calibration curve is created.

(3) Measurement of Amount of Multimeric Aldehyde Compound (B) in Resin Composition One hundred (100) mg of the resin composition is collected into a vial bottle, and the vial bottle is sealed with an aluminum cap and heated to 120° C. to vaporize the multimeric aldehyde compound (B). A peak is measured by a headspace gas chromatograph method under the conditions shown in Table 1 below.

(4) Quantification of Multimeric Aldehyde Compound (B)

Based on the calibration curve created in (2) above, the content of the multimeric aldehyde compound (B) is quantified using the peak obtained in (3) above.

TABLE 1

| Equipment name | Item | Measurement condition |
|---|---|---|
| Headspace gas chromatograph mass spectrometer (HS-GC-MS) | Device (HS) | 7697A manufactured by Agilent Technologies |
| | Device (GC) | 7890B manufactured by Agilent Technologies |
| | Device (MS) | 5977B manufactured by Agilent Technologies (quadrupol mass spectrometer) |
| <HS part> | Temperature (Oven) | 120° C. |
| | Temperature (Loop) | 130° C. |
| | Temperature (Transfer line) | 130° C. |
| | Vial equilibration time | 30 min |
| | Loop fill pressure | 20 psi → 2 psi |
| | Injection loop volume | 3 mL |
| | Shaking | No |
| <GC part> | Column | DB-WAX 30 m × 0.25 mm × 0.25 Iochm |
| | Carrier gas type and flow rate | Helium 1 mL/min |
| | Temperature (Oven) | 40° C. (5 min) → Rate 10° C./min → 250° C. (10 min) |
| | Temperature (Injection) | 200° C. |
| | Temperature (Auxiliary) | Transfer line = 250° C. |
| | Injection mode | Split injection method |
| | Split ratio | 1:30 |
| <MS part> | Detector | Mass spectrometer (electron multiplier tube) |
| | Ionization | Electron impact method |
| | Scan range | SIM m/z 58 (propanal) m/z 45, 89 (paraldehyde) |

[Other Components]

The resin composition of the present invention may contain other components such as a plasticizer in addition to the PVA-based resin (A) and the multimeric aldehyde compound (B).

Examples of the plasticizer include: compounds obtained by adding ethylene oxide to polyhydric alcohol, such as aliphatic polyhydric alcohols (e.g., ethylene glycol, hexanediol, glycerin, trimethylolpropane, and diglycerin); various alkylene oxides (e.g., ethylene oxide, propylene oxide, and a mixed adduct of ethylene oxide and propylene oxide); saccharides (e.g., sorbitol, mannitol, pentaerythritol, xylol, arabinose, and ribulose); phenolic derivatives such as bisphenol A and bisphenol S; amide compounds such as N-methylpyrrolidone; and glucosides such as α-methyl-D-glucoside.

The content of the plasticizer in the case of using the resin composition of the present invention containing a plasticizer is preferably 0.1 to 40 parts by weight, particularly preferably 1 to 30 parts by weight, and still more preferably 2 to 20 parts by weight, with respect to 100 parts by weight of the PVA-based resin (A). When the plasticizer is excessively few, the melt formability tends to decrease; when the plasticizer is excessive, the characteristics (e.g., gas barrier property and water solubility) of the PVA-based resin tends to be impaired.

Example of the other components include thermoplastic resins (e.g., polyethylene, polypropylene and polyester), fragrances, foaming agents, deodorants, extenders, fillers (inorganic fillers such as talc, clay, montmorillonite, calcium carbonate, glass beads, glass fiber, silica, mica, alumina, hydrotalcite, titanium oxide, zirconium oxide, boron nitride, or aluminum nitride, and organic fillers such as melamine-formalin resin), release agents, UV absorbers, antioxidants, processing stabilizers, weather resistance stabilizers, fungicides, and preservatives. These additives can be appropriately blended.

[Method for Producing Resin Composition]

Examples of a method for producing the resin composition of the present invention include: (i) a method of adding a multimeric aldehyde compound (B) to a PVA-based resin (A); (ii) a method of adding a multimeric aldehyde compound (B) to a polymer before saponification of a PVA-based resin (A), that is, a polymer obtained from a polymerization component containing at least a vinyl ester monomer, and then performing saponification; and (iii) a method of immersing a PVA-based resin (A) in a mixed solution of a multimeric aldehyde compound (B) and an alcohol. Among these, the method (i) is preferred from the viewpoint of content control.

The form of the resin composition of the present invention is generally a columnar form (pellet form) or a powder form. Since the PVA-based resin (A) is obtained in a powder form, it is preferable to melt and knead it together with the multimeric aldehyde compound (B) to form a cylindrical form as a raw material pellet.

Raw material pellets are generally used as raw materials for various types of melt molding. As for the shape, the diameter is generally 0.5 mm to 4 mm, preferably 1 mm to 3 mm, and particularly preferably 1.5 mm to 2.5 mm. The length is generally 0.5 mm to 4 mm, preferably 1 mm to 3 mm, and particularly preferably 1.5 mm to 2.5 mm.

In order to make the resin composition of the present invention into raw material pellets, it is preferable to use an extruder.

As the extruder, a single screw extruder or a twin screw extruder can be used. A twin screw extruder is preferred in that sufficient kneading can be obtained by appropriate shearing.

The L/D (screw length/screw diameter) of such an extruder is generally 10 to 80, preferably 15 to 70, and particularly preferably 20 to 60. When the L/D is excessively small, kneading tends to be insufficient to make ejection unstable; when the L/D is excessively large, the temperature of the resin composition tends to be too high due to the heat generated by excessive shearing, which tends to cause deterioration of the resin composition.

The screw rotation speed of the extruder is generally in a range of 10 rpm to 1000 rpm, preferably 30 rpm to 700 rpm, and particularly preferably 50 rpm to 500 rpm. When the rotation speed is excessively small, ejection tends to be unstable; when the rotation speed is excessively large, the resin composition tends to deteriorate due to the heat generated by excessive shearing.

The temperature of the resin composition in the extruder cannot be generally determined and depends on the desired processing amount, and is generally in a range of 140° C. to 280° C., preferably 150° C. to 260° C., and particularly preferably 170° C. to 240° C.

When the resin temperature is excessively high, the PVA-based resin (A) tends to be thermally deteriorated and easily colored; when the resin temperature is excessively low, the viscosity of the resin tends to be high, the load tends to be applied to the extruder, or the PVA-based resin (A) tends to be not sufficiently melted.

The method for adjusting the resin temperature is not particularly limited. Generally, a method of appropriately setting the temperature of the cylinder in the extruder or a method of controlling by the number of revolutions of the extruder is used.

Examples of a method for further melt molding the raw material pellets using the resin composition of the present invention obtained above include an extrusion molding method (T-die extrusion, inflation extrusion, blow molding, melt spinning, or profile extrusion), and an injection molding method. Various molded products such as films, sheets, containers (bottles or tanks), fibers, rods, or tubes can be produced by melt molding, particularly melt extrusion molding, raw material pellets using the resin composition of the present invention. The films and sheets as molded products of the resin composition can also be used for various uses as they are. Generally, in order to further increase the strength or to provide other functions, a laminate can be obtained by laminating with another base material.

Examples of the molded product produced by melt-molding the resin composition of the present invention include those having various shapes such as films, sheets, pipes, disks, rings, bags, bottles, and fibers. Specifically, it is useful as various packaging materials for electronic parts, foods, beverages (coffee capsules), cosmetics, pharmaceuticals, agricultural chemicals, and industrial chemicals, water-soluble cores, and filaments for hot melt additive manufacturing.

The resin composition of the present invention can prevent the acetic acid odor generated from the degassing during the melt molding of the resin composition and the discharge port of the extruder when producing raw material pellets or molded products as described above. Therefore, the acetic acid odor of the obtained pellets or molded products can be prevented.

EXAMPLES

Hereinafter, although the present invention is demonstrated further more concretely by ways of Examples, the present invention is not limited to following Examples, unless the gist of the present invention is exceeded.

"Part" and "%" in Examples and Comparative Examples are based on weight.

The degree of saponification and the viscosity average polymerization degree of the PVA-based resin (A) in the following Examples and Comparative Examples were measured according to the methods described above.

Example 1

[Production of Resin Composition 1]
An unmodified PVA was produced by a common method. The obtained PVA had a degree of saponification of 73 mol % and a viscosity average polymerization degree of 550. To 100 parts of the obtained unmodified PVA, 0.005 part of paraldehyde was added to obtain a resin composition 1.
[Method of Measuring Content of Multimeric Aldehyde Compound (B)]
For the resin composition 1 obtained above, the content of paraldehyde was measured. The results are shown in Table 3.
(1) Preparation of Standard Solution for Quantification
One (1) g of paraldehyde was collected into a well-washed glass measuring flask (100 mL) and dissolved with acetone, and an acetone solution containing paraldehyde in a concentration of 10000 mg/L was obtained.
Further, the acetone solution was diluted with acetone to prepare several types of standard solutions containing paraldehyde in concentrations of 40 mg/L to 5000 mg/L.
(2) Creation of Calibration Curve
One (1)µL of each of the standard solutions containing paraldehyde in concentrations of 40 mg/L to 5000 mg/L prepared in (1) above was collected into a headspace vial, and the headspace vial was quickly sealed with an aluminum cap and heated to 120° C. to vaporize paraldehyde. A peak was measured by a headspace gas chromatograph method under the conditions shown in Table 2 below, and a calibration curve was created.
(3) Measurement of Amount of Paraldehyde in Resin Composition 1
One hundred (100) mg of the resin composition 1 was collected into a vial bottle, and the vial bottle was sealed with an aluminum cap and heated to 120° C. to vaporize paraldehyde. A peak was measured by a headspace gas chromatograph method under the conditions shown in Table 2 below.
(4) Quantification of Paraldehyde
Based on the calibration curve created in (2) above, the content of paraldehyde was quantified using the peak obtained in (3) above.

TABLE 2

| Equipment name | Item | Measurement condition |
| --- | --- | --- |
| Headspace gas chromatograph mass spectrometer (HS-GC-MS) | Device (HS) | 7697A manufactured by Agilent Technologies |
| | Device (GC) | 7890B manufactured by Agilent Technologies |
| | Device (MS) | 5977B manufactured by Agilent Technologies (quadrupol mass spectrometer) |
| <HS part> | Temperature (Oven) | 120° C. |
| | Temperature (Loop) | 130° C. |
| | Temperature (Transfer line) | 130° C. |
| | Vial equilibration time | 30 min |
| | Loop fill pressure | 20 psi → 2 psi |
| | Injection loop volume | 3 mL |
| | Shaking | No |
| <GC part> | Column | DB-WAX 30 m × 0.25 mm × 0.25 lochm |
| | Carrier gas type and flow rate | Helium 1 mL/min |
| | Temperature (Oven) | 40° C. (5 min) → Rate 10° C./min → 250° C. (10 min) |

TABLE 2-continued

| Equipment name | Item | Measurement condition |
| --- | --- | --- |
| | Temperature (Injection) | 200° C. |
| | Temperature (Auxiliary) | Transfer line = 250° C. |
| | Injection mode | Split injection method |
| | Split ratio | 1:30 |
| <MS part> | Detector | Mass spectrometer (electron multiplier tube) |
| | Ionization | Electron impact method |
| | Scan range | SIM m/z 58 (propanal) m/z 45, 89 (paraldehyde) |

[Evaluation on Acetic Acid Odor]
Next, for the resin composition 1, the odor was evaluated by the following method using a plastograph (small torque detector by a mixer extruder) manufactured by Brabender GmbH & Co KG.
Fifty-five (55) g of the resin composition 1 was weighed, the weighed resin composition 1 was charged into a plastograph, which has been heated to 200° C. in advance, at a kneader rotation speed of 20 rpm within 90 seconds, and the sample inlet was closed with a special lid. After the sample was charged, the mixture was kneaded at 200° C. and 50 rpm for 2 minutes. Thereafter, the kneader was stopped and the sample inlet was opened. At this time, the presence or absence of the odor of acetic acid (acetic acid odor) from the sample inlet was confirmed by five panelists and evaluated according to the following criteria. The results are shown in Table 3.
<Evaluation Criteria of Acetic Acid Odor>
Three or more among the five panelists do not feel an acetic acid odor: A
Three or more among the five panelists feel an acetic acid odor: B Example 2

[Production of Resin Composition 2]
An unmodified PVA was produced by a common method. The obtained PVA had a degree of saponification of 78 mol % and a viscosity average polymerization degree of 550. To 100 parts of the obtained unmodified PVA, 0.005 part of paraldehyde was added to obtain a resin composition 2.
For the resin composition 2, the paraldehyde content was measured and the acetic acid odor was evaluated as in Example 1. The results are shown in Table 3.

Example 3

[Production of Resin Composition 3]
To a reactor equipped with a reflux condenser, a dripping device, and a stirrer, 280 parts of vinyl acetate (40% of the total is used in initial charging), 185.5 parts of methanol and 35.36 parts of 3,4-diacetoxy-1-butene (40% of the total is used in initial charging) were charged, the reactor was stirred, the temperature was raised under a nitrogen stream to reach the boiling point, and then 0.093 part of acetyl peroxide was added to initiate polymerization.
Then, 0.75 hours after the start of polymerization, 420 parts of vinyl acetate and 53.04 parts of 3,4-diacetoxy-1-butene were added dropwise at a constant rate over 12.5 hours. When the polymerization rate of vinyl acetate reached 98%, m-dinitrobenzene was added in a predetermined amount thereto to terminate the polymerization. Subsequently, by distilling to blow the methanol vapor, the unreacted vinyl acetate monomer was removed from the system, whereby a methanol solution of a copolymer was obtained.
Then, the above solution was diluted with methanol and adjusted to have a solid content concentration of 50%, and this methanol solution was charged into a kneader. The solution temperature was maintained at 35° C., and a methanol solution of sodium hydroxide, having a sodium concentration of 2%, was added in an amount of 4.1 mmol with respect to 1 mol (total amount) of vinyl acetate structural units and 3,4-diacetoxy-1-butene structural units in the copolymer, thereby performing saponification. When the saponification proceeded, a saponified product precipitated and became particulate. From this time to a predetermined time, acetic acid for neutralization was added in an amount corresponding to 1.0 equivalent of sodium hydroxide. The saponified product was filtered, well washed with methanol and dried in a hot air dryer to obtain a modified PVA-based resin containing a side-chain 1,2-diol structural unit.

The degree of saponification of the obtained modified PVA-based resin containing a side-chain 1,2-diol structural unit was analyzed by alkali consumption required for hydrolysis of the residual vinyl acetate and 3,4-diacetoxy-1-butene structural units in the resin, and was found to be 86 mol %. The viscosity average polymerization degree was analyzed according to JIS K6726, and was found to be 450.

The content of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 6 mol %.

To 100 parts of the modified PVA-based resin containing a side-chain 1,2-diol structural unit obtained above, 0.005 part of paraldehyde was added to obtain a resin composition 3.

For the resin composition 3, the paraldehyde content was measured and the acetic acid odor was evaluated as in Example 1. The results are shown in Table 3.

Example 4

[Production of Resin Composition 4]

An unmodified PVA was produced by a common method. The obtained PVA had a degree of saponification of 88 mol % and a viscosity average polymerization degree of 550. To 100 parts of the obtained unmodified PVA, 0.005 part of paraldehyde was added to obtain a resin composition 4.

For the resin composition 4, the paraldehyde content was measured and the acetic acid odor was evaluated as in Example 1. The results are shown in Table 3.

Example 5

[Production of Resin Composition 5]

To a reactor equipped with a reflux condenser, a dripping device, and a stirrer, 280 parts of vinyl acetate (40% of the total is used in initial charging), 185.5 parts of methanol and 35.36 parts of 3,4-diacetoxy-1-butene (40% of the total is used in initial charging) were charged, the reactor was stirred, the temperature was raised under a nitrogen stream to reach the boiling point, and then 0.093 part of acetyl peroxide was added to initiate polymerization.

Then, 0.75 hours after the start of polymerization, 420 parts of vinyl acetate and 53.04 parts of 3,4-diacetoxy-1-butene were added dropwise at a constant rate over 12.5 hours. When the polymerization rate of vinyl acetate reached 98%, m-dinitrobenzene was added in a predetermined amount thereto to terminate the polymerization. Subsequently, by distilling to blow the methanol vapor, the unreacted vinyl acetate monomer was removed from the system, whereby a methanol solution of a copolymer was obtained.

Then, the above solution was diluted with methanol and adjusted to have a solid content concentration of 50%, and this methanol solution was charged into a kneader. The solution temperature was maintained at 35° C., and a methanol solution of sodium hydroxide, having a sodium concentration of 2%, was added in an amount of 4.3 mmol with respect to 1 mol (total amount) of vinyl acetate structural units and 3,4-diacetoxy-1-butene structural units in the copolymer, thereby performing saponification. When the saponification proceeded, a saponified product precipitated and became particulate. At this time, a methanol solution of sodium hydroxide, having a sodium concentration of 2%, was further added in an amount of 8 mmol with respect to 1 mol (total amount) of vinyl acetate structural units and 3,4-diacetoxy-1-butene structural units, thereby performing saponification.

Thereafter, acetic acid for neutralization was added in an amount corresponding to 0.8 equivalent of sodium hydroxide. The saponified product was filtered, well washed with methanol and dried in a hot air dryer to obtain a modified PVA-based resin containing a side-chain 1,2-diol structural unit.

The degree of saponification of the obtained modified PVA-based resin containing a side-chain 1,2-diol structural unit was analyzed by alkali consumption required for hydrolysis of the residual vinyl acetate and 3,4-diacetoxy-1-butene structural units in the resin, and was found to be 99.2 mol %. The viscosity average polymerization degree was analyzed according to JIS K6726, and was found to be 450.

The content of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 6 mol %.

To 100 parts of the modified PVA-based resin containing a side-chain 1,2-diol structural unit obtained above, 0.005 part of paraldehyde was added to obtain a resin composition 5.

For the resin composition 5, the paraldehyde content was measured and the acetic acid odor was evaluated as in Example 1. The results are shown in Table 3.

Comparative Example 1

The same manner as Example 1 was conducted, except that only an unmodified PVA (degree of saponification 73 mol %, viscosity average polymerization degree 550) was used, and no paraldehyde was added.

For the unmodified PVA, the paraldehyde content was measured and the acetic acid odor was evaluated as in Example 1. The results are shown in Table 3.

Comparative Example 2

A resin composition 6 was obtained in the same manner as in Example 1 except that 0.002 part of propanal was added instead of 0.005 part of paraldehyde.

For the obtained resin composition 6, the propanal content was measured and the acetic acid odor was evaluated as in Example 1. In Comparative Example 2, preparation of a standard solution and creation of a calibration curve in [Method of Measuring Content of Multimeric Aldehyde Compound (B)] in Example 1 were performed using propanal instead of paraldehyde. The results are shown in Table 3.

Reference Example 1

To 100 parts of a saponified ethylene-vinyl acetate copolymer (ethylene structural unit content 32 mol %, degree of saponification 99.9%), 0.005 part of paraldehyde was added to obtain a resin composition 7.

For the obtained resin composition 7, the paraldehyde content was measured and the acetic acid odor was evaluated as in Example 1. The results are shown in Table 3.

TABLE 3

| | PVA-based resin (A) | | | Multimeric aldehyde compound (B) | | Evaluation |
| --- | --- | --- | --- | --- | --- | --- |
| | Degree of saponification (mol %) | Degree of polymerization | Modification rate (mol %) | Type | Content (part) of aldehyde compound with respect to 100 parts of PVA-based resin (A) | Acetic acid odor |
| Example 1 | 73 | 550 | Unmodified | Paraldehyde | $3.6 \times 10^{-4}$ | A |
| Example 2 | 78 | 550 | Unmodified | Paraldehyde | $3.2 \times 10^{-4}$ | A |
| Example 3 | 86 | 450 | 6 | Paraldehyde | $0.9 \times 10^{-4}$ | A |
| Example 4 | 88 | 550 | Unmodified | Paraldehyde | $1.5 \times 10^{-4}$ | A |
| Example 5 | 99.2 | 450 | 6 | Paraldehyde | $0.5 \times 10^{-4}$ | A |
| Comparative Example 1 | 73 | 550 | Unmodified | Paraldehyde | Quantification limit or less | B |
| Comparative Example 2 | 73 | 550 | Unmodified | Propanal | $5.9 \times 10^{-4}$ | B |
| Reference Example 1 (EVOH) | 99.9 | — | Ethylene content 32 mol % | Paraldehyde | Quantification limit or less | A |

The resin compositions of Examples 1 to 5 containing the multimeric aldehyde compound (B) in the amount specified in the present invention did not have an acetic acid odor. On the other hand, the resin composition in Comparative Example 1 containing the multimeric aldehyde compound (B) in a very small amount (detected but not quantified) had am acetic acid odor, and Comparative Example 2 containing no multimeric aldehyde compound (B) but containing propanal also had an acetic acid odor.

In Reference Example 1 using EVOH, there was no acetic acid odor even when the amount of the multimeric aldehyde compound (B) was very small.

Although the present invention has been described in detail with reference to specific embodiments, it will be apparent to those skilled in the art that various changes and modifications can be made without departing from the spirit and scope of the present invention. The present application is based on a Japanese Patent Application (2017-172434) filed on Sep. 7, 2017, contents of which are incorporated herein by reference.

INDUSTRIAL APPLICABILITY

In the resin composition of the present invention, the acetic acid odor generated from the degassing during the melt molding of the PVA-based resin and the discharge port of the extruder are reduced, and the acetic acid odor of the molded product is also prevented. Therefore, the resin composition of the present invention is useful as a raw material of various packaging materials for electronic parts, foods, beverages, cosmetics, pharmaceuticals, agricultural chemicals, and industrial chemicals.

The invention claimed is:

1. A resin composition comprising:
   a polyvinyl alcohol-based resin (A); and
   a multimeric aldehyde compound (B),
   wherein a content of the multimeric aldehyde compound (B) is $0.5 \times 10^{-4}$ to $100 \times 10^{-4}$ parts by weight with respect to 100 parts by weight of the polyvinyl alcohol-based resin (A).

2. The resin composition according to claim 1, wherein the polyvinyl alcohol-based resin (A) is a polyvinyl alcohol resin for melt molding (A1).

3. The resin composition according to claim 1, wherein a viscosity average polymerization degree of the polyvinyl alcohol-based resin (A) is 200 to 800.

4. The resin composition according to claim 1, wherein a degree of saponification of the polyvinyl alcohol-based resin (A) is 60 mol % to 100 mol %.

5. The resin composition according to claim 1, wherein the multimeric aldehyde compound (B) is paraldehyde.

* * * * *